March 16, 1937. V. Y. BROWN Re. 20,292

VEHICLE

Original Filed Dec. 26, 1929 3 Sheets-Sheet 1

INVENTOR
V. Y. Brown
BY
J. Quirie
ATTORNEY

March 16, 1937. V. Y. BROWN Re. 20,292

VEHICLE

Original Filed Dec. 26, 1929 3 Sheets-Sheet 2

INVENTOR
V. Y. Brown
BY
ATTORNEY

March 16, 1937. V. Y. BROWN Re. 20,292

VEHICLE

Original Filed Dec. 26, 1929 3 Sheets-Sheet 3

INVENTOR
V. Y. Brown
BY
G. Fourie
ATTORNEY

Reissued Mar. 16, 1937

Re. 20,292

UNITED STATES PATENT OFFICE 20,292

VEHICLE

Victor Yeats Brown, Tonbridge, England, assignor to William Cornelison Anthony, Streator, Ill.

Original No. 1,844,003, dated February 9, 1932, Serial No. 416,655, December 26, 1929. Renewed December 24, 1931. Application for reissue November 9, 1936, Serial No. 109,949. In Great Britain January 10, 1929

10 Claims. (Cl. 280—33.4)

Figure 1:
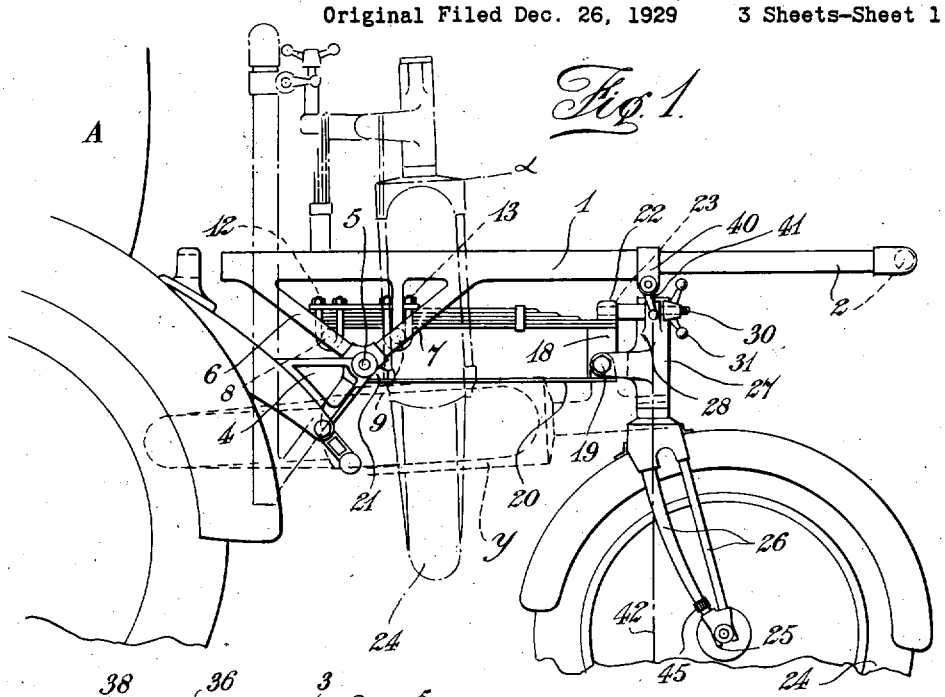

This invention relates to load or luggage-carrying attachments for vehicles more particularly motor vehicles and has for its object to provide an improved construction of frame which may be used per se as a luggage or load carrier or as a trailer.

According to the present invention a wheeled load-carrying frame is provided which is adapted to be attached to and detached from the rear of a vehicle. The aforesaid frame may comprise a main frame and an auxiliary frame telescopically and/or foldably associated with the main frame, either the main frame or the auxiliary frame or both frames being provided with an adjustable and/or removable wheel or wheels. The frame as a whole may be collapsible and foldable into a position behind the vehicle and at the rear end thereof for stowage purposes. The wheel or wheels carried by the aforesaid frame may be angularly displaceable into a position beneath the frame and the wheel itself may be displaceable into a position such that the plane of the wheel is approximately parallel to the plane of the frame. The frame is formed preferably of a light tubular construction and may be in one or more than one part, any additional part or additional parts being preferably of a telescopic foldable or extensible nature. A convenient form however is a frame formed in at least two parts interconnectible in such manner as to form a load carrier and/or a trailer when extended and a grid or luggage or load carrier when collapsed. In a convenient construction however the frame comprises a main frame adapted if so desired to carry one or more than one wheel and capable of being connected to a vehicle preferably motor vehicle in such a manner that the main frame can be arranged to extend behind the said vehicle in a horizontal plane or in such manner that the frame can be swung up on pivotal supports into an approximately vertical position. The main frame carries an auxiliary frame formed with members telescopically or slidably attachable to the main frame which can be hingedly connected to the tractor vehicle so that the hinged frame and/or the telescopic frame may be collapsed or folded together and thereafter the two frames may both be collapsed or folded. The auxiliary frame can be folded back or telescoped out of the way when the hinged main frame is to be used as a grid or fixed carrier. The hinged main frame and/or the auxiliary frame may be provided with a swivelling wheel support the wheel centre thereof being offset from the centre line of the swivelling support to the rear so that the said wheel acts as a castor or trailing wheel and the swivelling wheel support may be mounted in trunnions pivotally connected to the hinged main frame so that the wheel and the support therefor may be folded up under the hinged main frame preparatory to stowage.

In order that the invention may be clearly understood and readily carried into effect reference is made to the accompanying drawings which show diagrammatically and by way of example a frame construction in accordance with the present invention.

Figure 2:
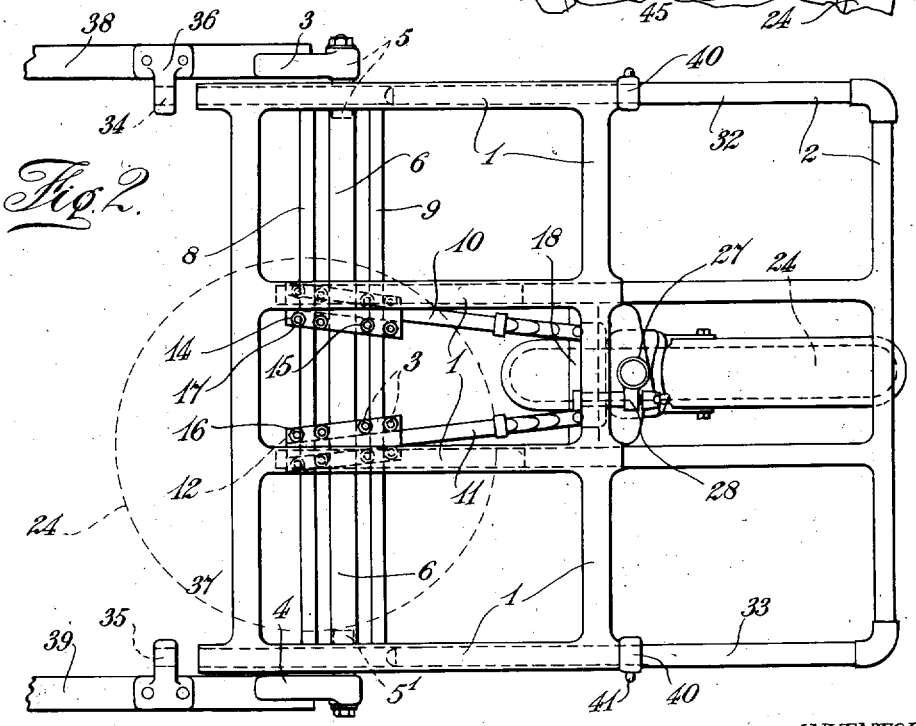
Figure 3:
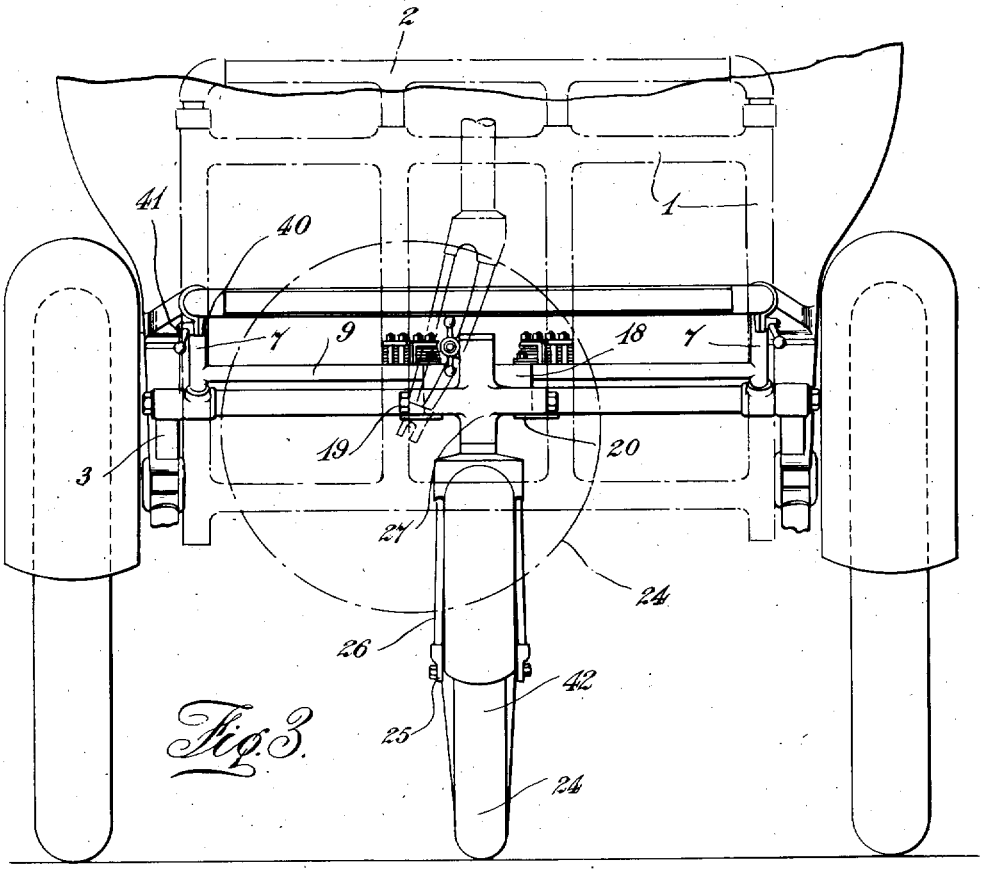
Figure 4:
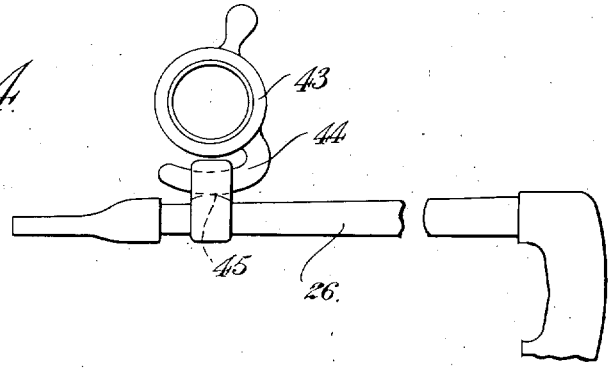
Figure 5:
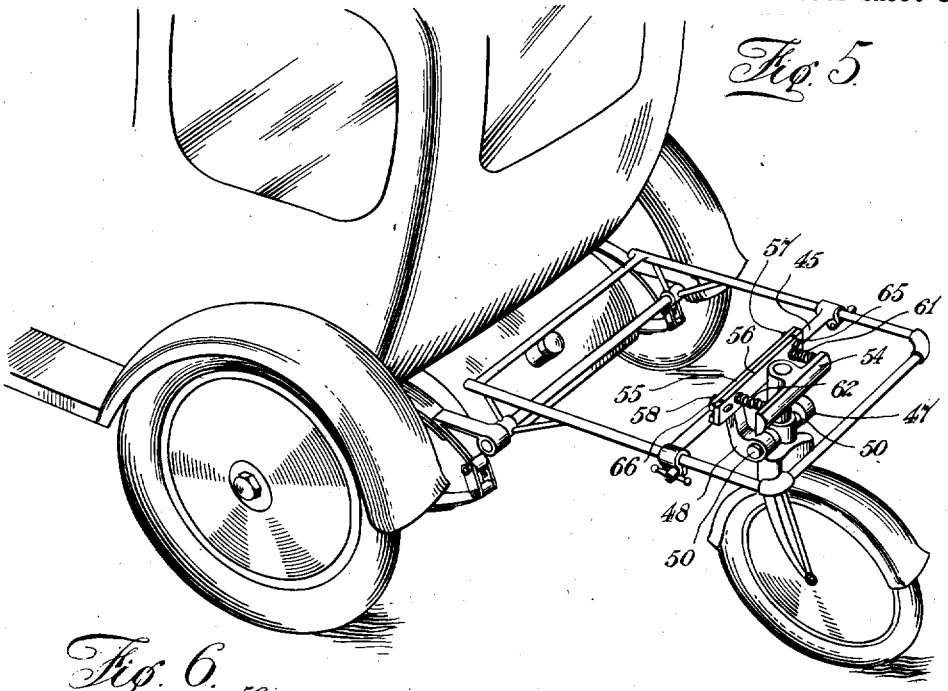

Figure 1 is a side elevation of the rear part of a vehicle having a frame in accordance with the present invention removably and collapsibly attached thereto, Figure 2 is a plan of Figure 1, Figure 3 is a rear end elevation of Figure 1, Figure 4 drawn to an enlarged scale is a detail view of a wheel catch hereinafter described, Figure 5 is a perspective view of a modified form of frame in accordance with the present invention, Figure 6 drawn to an enlarged scale shows the wheel support of Figure 5 and means which permit of the wheel and its associated parts being folded up into the stowage position, Figure 7 drawn to an enlarged scale is a plan view of Figure 6.

Referring to Figures 1 to 4 of the drawings the rear of a vehicle is shown at A and the frame in accordance with the present invention may be formed in one or more than one part and may comprise a main frame preferably of longitudinally arranged and lateral members 1 and an auxiliary frame 2 comprising longitudinal members united by one or more than one cross member. The members comprising both frames are preferably of a tubular nature but the members of the main frame may be tubular and the members of the auxiliary frame may be solid or vice versa. The main frame 1 may be made of tubes, solid rods or flat or channel bars and there may be one or more than one auxiliary frame which if so desired may be omitted. The tractor vehicle A is preferably provided with two brackets 3, 4 which may be suitably secured for example to the dumb iron or other suitable part of the tractor vehicle A. The brackets 3, 4 carry stub pivots, 5, 5' coupled by a cross tube 6' and the longitudinal members of the main frame are provided with downwardly extending and converging tubular members 6, 7 which are rockably mounted on the pivots, 5, 5' carried by the brackets 3, 4. Any suitable type of pivotal connection may be made between the cross member 6 and the brackets 3, 4. The two pairs of downwardly extending and converging tubular members 6, 7 are inter-connected by cross stays 8, 9. Two sets 10, 11 of laminated or plate springs are secured to the cross stays 8, 9 by U-shaped bolts 12, 13 and 14, 15. Between the securing nuts on the bolt and each set of springs is interposed a plate 16, 17. The opposite ends of the composite sets of springs are supported on a bracket 18 carrying a pivot 19 the bracket 18 being supported on a plate 20 secured to or rockably hung from the cross member 6 by a bracket 21. On the upper surface of the bracket 18 is a block 22 in which is a hole 23. 24 is a trailer wheel of which there may however be two, one disposed at each side of the trailer frame, or one wheel may be disposed on either side of a central support or two wheels may be supported between side supports such as 26. The wheel 24 is pivotally carried as at 25 by a forked member 26 supported in ball bearings by a tubular upright member 27 having a lug 28 or lugs through which passes a pin 30 adapted to enter the hole 23 in the block 22 so that the upright 27 can be clamped to the block 22 by manipulating the handle 31 or nut on the screw threaded pin 30 or stud. This stud may be rockably mounted in bracket 18 and lug 28 may be provided with a slot and recess to accommodate the base of nut 31 so that the stud may be swung clear when the nut is loosened without the need for completely removing the nut from the stud. The side members 32, 33 of the auxiliary frame can be pushed into the longitudinal side members of the main frame and caused to engage in holes 34, 35 in brackets 36, 37 secured to the side frames 38, 39 of any desired tractor vehicle such as A. Such a construction maintains the main frame or the main frame and auxiliary frame in longitudinal alignment with the tractor vehicle. Further, the longitudinal tubes or rods 32, 33 of the auxiliary frame can be clamped in position by the clamping device comprising a split collar 40 having lugs which can be drawn together by the clamping handle 41 so as to grip the tube or rod 32.

From the foregoing description in conjunction with the drawings Figures 1 to 3 it will be understood that the wheel centre is offset from the centre line 42 Figure 1 of the swivelling support formed by the upright 27 to the rear thereof so that the wheel 24 (or wheels) act as a castor or castors or trailing wheel or wheels. It should be clearly understood however that twin wheels may be used when extra strength is required. The wheel 24 and its support 27 may be turned on the pivot 19 and folded up under the main frame 1 as shown in dotted lines in Figure 1 preparatory to stowage. Means are provided to retain the wheel in this position the said means comprising a rotatable hand operated collar 43 carrying a hook shaped catch 44 which engages an eyeleted socket 45 mounted on the fork of the wheel 4. The whole frame is free to rise or fall as the case may be in accordance with the road conditions by reason of its hinged attachment to the vehicle whilst at the same time the said frame is held rigid laterally to the vehicle and the wheel or wheels are free to follow the requisite path as the tractor vehicle turns by reason of the pivotal and offset support. When the auxiliary frame 2 is not required it may be telescoped into the frame 1 and the wheel 24 may be swung up on the pivot 19 into the dotted position as shown in Figure 1 after releasing the retaining handle 31. In this position the frame 1 may be used as a grid or luggage carrier for a light passenger or for luggage the frame 1 being rigidly maintained in position behind the tractor vehicle by the supporting brackets 3, 4 and the inter-engagement of the side tubes of the frame 1 with the holes 34, 35 in the brackets 36, 37 secured to the side frames 38, 39 of the tractor vehicle.

If however it be not desired to use the grid or carrier the auxiliary frame 2 may be telescoped into the main frame and the two frames may be swung up on the stub pivots 5, 5′ into the position shown in dot and dash lines in Figure 1. In this position it will be seen from the drawings and readily understood from the description that the wheel 24 can be turned into a position at right angles to the longitudinal axis of the tractor vehicle A as shown in dot and dash lines in Figure 1. Obviously however the trailer vehicle can be entirely removed from its supporting brackets 3 and 4. When the wheel 24 is moved to either of the inoperative positions shown in dotted lines or in dot and dash lines in Figure 1 it occupies a plane generally parallel to the plane occupied by the main frame 1 and where any reference to parallelism between the frame and the wheel occurs in the claims, it is to be taken as meaning that the wheel, when in the inoperative position, lies generally parallel to the plane which the frame as a whole occupies. Thus when the frame 1 is in operative position it lies generally horizontal, although it may vary above and below the horizontal, and when the wheel is in the dotted line position it also is generally horizontal and correspondingly substantially parallel to the frame 1. When the frame is in the dot and dash position of Figure 1 it is generally vertical. So also is the wheel, as shown in that figure in dot and dash lines.

Suppose it be desired to remove the wheel 24 instead of turning it up into the position shown in Figure 1 this may be effected by making the horizontal pivot 19 passing through the bracket 18 removable.

Figure 6:
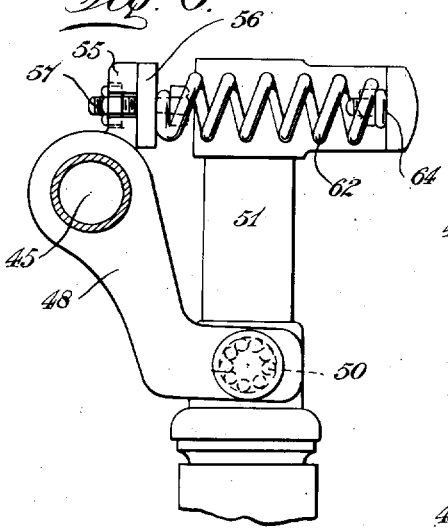
Figure 7:
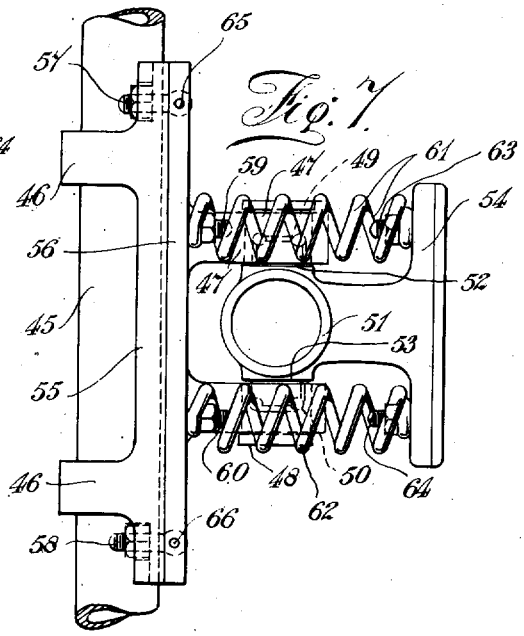

In the modified constructional form shown in Figures 5, 6 and 7 the longitudinal side members of the frame 1 are connected by a cross tube 45 or stay carrying a bracket having rearwardly projecting lugs 47, 48 provided with ball bearings 49, 50 in which a bearing tube 51 for the wheel forks is supported. The bearing tube 51 is provided with lateral projections 52, 53 which co-act with the ball bearings 49 and 50 and with a cross bar 54 of T shaped form. The upper end of the bracket having the lugs 47 and 48 is formed with a flat lateral plate 55 to which is secured a plate 56 by bolts 57, 58. The plate 56 is provided with studs 59 and 60 and between the T head 54 and the plate 56 are interposed helical springs 61, 62. By removing the nuts on the bolts 57, 58 the plate 56 the T head 54 and the springs 61 and 62 together with the upright 51 and the wheel 24 can be swung up on the bearings 49 and 50 into the position shown in Figure 1, the wheel itself being turned so as to lie in a horizontal plane as shown. The ends of the springs 61, 62 may be closed in so as to form coils of smaller diameter so that they can be gripped by the nuts on the studs 59, 60 and 63, 64. The bolts 57, 58 may be engaged with the lateral plate 55 on the bracket 46 by means of a slot connection the bolts 57, 58 in this case being provided with vertical pivots, 65, 66 passing through the plate 56 so as to avoid removal of the nuts on the bolts 57, 58.

The main frame and the auxiliary frame may be closed on top by an overlay of metal or other suitable material. Both frames may however be opened and a cover or deck of sheet metal, wire mesh or other suitable material may be provided so that it can be readily attached to and removed from the upper surface of the main frame and/or the auxiliary frame and on this cover or on any suitable support or seating attached thereto a passenger or passengers or luggage or any desired load within the limits of the structural strength of the frame may be supported or transported as and when desired. It is preferred that the means of attachment of the hinged main frame I may be such that the said means may be easily and readily adapted to suit vehicles of different types and the general construction of the parts may be so devised to conform or be easily made to conform to the varying requirements as to load and service.

What I claim is:

1. A load carrying frame adapted to be movably connected to the rear end of a vehicle including a main frame, means for supporting the main frame for swinging movement with respect to the vehicle, an auxiliary frame movably connected to the main frame, and a ground engaging wheel carried by the main frame an elongated laminated spring being interposed between the said wheel and the said frames.

2. A wheeled load carrying frame designed for attachment to the rear end of a vehicle including a main frame, means for mounting the main frame for swinging movement with respect to the vehicle, a ground wheel carried by the main frame to support the frame remote from the vehicle, and means for mounting said wheel with respect to the main frame to permit the wheel to be displaceable into a position in parallelism with the main frame when the latter is swung upwardly on its connection with the vehicle.

3. A load carrying frame for vehicles including a main frame, means for swingingly supporting the main frame with respect to the vehicle, an auxiliary frame telescopically mounted on the main frame, and means on the vehicle to receive the ends of the auxiliary frame in a predetermined position of the latter to hold the main frame against swinging movement with respect to the vehicle.

4. A load carrying frame for vehicles including a main frame, means for swingingly supporting the main frame with respect to the vehicle, an auxiliary frame telescopically mounted on the main frame, means on the vehicle to receive the ends of the auxiliary frame in a predetermined position of the latter to hold the main frame against swinging movement with respect to the vehicle, and a ground wheel for supporting the load carrying frame remote from the vehicle.

5. A load carrying frame for vehicles including a main frame, means for swingingly supporting the main frame with respect to the vehicle, an auxiliary frame telescopically mounted on the main frame, means on the vehicle to receive the ends of the auxiliary frame in a predetermined position of the latter to hold the main frame against swinging movement with respect to the vehicle, a ground wheel for supporting the load carrying frame remote from the vehicle, and means for moving the wheel into a plane parallel to that of the main frame at will.

6. A load carrying frame to be attached to the rear end of a vehicle including a main frame, means whereby the main frame is swingingly supported with respect to the vehicle, a ground engaging wheel for the main frame, a swiveling wheel support intermediate the wheel and main frame, and trunnions for said swiveling wheel support pivotally connected to the main frame whereby the wheel and swiveling support may be folded beneath the main frame.

7. A load carrying frame adapted to be movably connected to the rear of a vehicle and including longitudinally extending frame members and a transverse wheel supporting part extending transversely of said frame members, means for supporting said frame for swinging movement with respect to said vehicle about a generally horizontal axis perpendicular to the length of the vehicle, a ground engaging wheel mounted upon said transverse member and adapted to support said frame, a generally vertical swivel connection between said frame and wheel, adapted to permit said wheel to swivel about a generally vertical axis, and yielding means comprising elongated laminated springs fixed at one end to said frame and attached at the other to said swivel connection and being effective upon said wheel to permit it to rise and fall with respect to said frame in response to road shocks and variations in the load carried by said frame.

8. A load carrying frame adapted to be movably connected to the rear of a vehicle and including longitudinally extending frame members and a transverse wheel supporting part extending transversely of said frame members, means for supporting said frame for swinging movement with respect to said vehicle about a generally horizontal axis perpendicular to the length of the vehicle, a ground engaging wheel mounted upon said transverse member and adapted to support said frame, a generally vertical swivel connection between said frame and wheel, adapted to permit said wheel to swivel about a generally vertical axis, and yielding means interposed between said wheel swivel connection and said frame, said yielding means comprising a spring joined at one end to said frame and at the other to said swivel connection and effective upon said wheel to permit it to rise and fall with respect to said frame in response to road shocks and variations in the load carried by said frame.

9. A load carrying frame adapted to be movably connected to the rear of a vehicle and including longitudinally extending frame members and a transverse wheel supporting part situated intermediate the ends of said frame members and in the same generally horizontal plane and extending transversely of them, means for supporting said frame for swinging movement with respect to said vehicle about a generally horizontal axis perpendicular to the length of the vehicle, a ground engaging wheel mounted upon said transverse member and adapted to support said frame, a generally vertical swivel connection between said frame and wheel, adapted to permit said wheel to swivel about a generally vertical axis, and yielding means interposed between said wheel swivel connection and said frame and effective upon said wheel to permit it to rise and fall with respect to said frame in response to road shocks and variations in the load carried by said frame.

10. A load carrying frame adapted to be movably connected to the rear of a vehicle and including longitudinally extending frame members and a transverse wheel supporting part extending transversely of said frame members and in the same generally horizontal plane, means for supporting said frame for swinging movement with respect to said vehicle about a generally horizontal axis perpendicular to the length of the vehicle, a ground engaging wheel mounted upon said transverse member and adapted to support said frame, a swivel connection for said wheel adapted to permit swiveling movement of the wheel and yielding means interposed between the swivel connection and the frame effective to permit the wheel to rise and fall with respect to said frame in response to road shocks and variations in the load carried by said frame.

VICTOR YEATS BROWN.